March 21, 1933.   L. L. COOMBER   1,902,218
WHEEL RAMP
Filed May 16, 1930   2 Sheets-Sheet 1

Inventor:
Louis L. Coomber
By Wilson, Dowell, McCanna & Rehm
Attys.

March 21, 1933. L. L. COOMBER 1,902,218
WHEEL RAMP
Filed May 16, 1930 2 Sheets-Sheet 2

Inventor:
Louis L. Coomber

Patented Mar. 21, 1933

1,902,218

UNITED STATES PATENT OFFICE

LOUIS L. COOMBER, OF FREEPORT, ILLINOIS

WHEEL RAMP

Application filed May 16, 1930. Serial No. 452,874.

My invention relates to ramps and is directed particularly to wheel ramps for automobiles on which a wheel of an automobile having a flat tire is adapted to be driven whereby a jack may be conveniently placed beneath the axle thereof and the ramp collapsed and withdrawn from beneath the wheel.

Owing to the general adoption of the balloon tires and the reduction in size of wheels by automobile manufacturers it has become particularly difficult to place and operate a lifting jack beneath the wheel of an automobile when the tire has become deflated by a puncture or otherwise. Because of the smallness of the wheel and the relative largeness of the tire, when the tire is deflated the axle sinks to a point quite near the ground. There is, therefore, but little clearance between the top of the completely lowered jack and the axle when the former is placed between the ground and the latter, making it exceedingly difficult to properly position the jack. It is also difficult to operate the lever of the jack in the cramped quarters between the bottom of the car and the ground and, because of the size of the tire, a great many strokes of the lever are required to lift the wheel and tire completely free from the ground.

My invention contemplates the provision of a ramp upon which a wheel having a deflated tire may be driven, under the power of the automobile, after which a fully extended jack may be placed under the axle and the ramp collapsed to leave the axle suspended upon the jack. The ramp, having served its purpose, may then be removed from beneath the wheel.

I have, therefore, aimed to provide a wheel ramp upon which the wheel of an automobile is adapted to be driven for the purpose of elevating the axle of the car near the wheel.

Another object of the invention is the provision of a portable ramp adapted to be carried in an automobile for the purpose of elevating the axle of the automobile to a suitable height for placing an extended jack thereneath and which may then be collapsed to free the tire therefrom.

A further object of the invention is the provision of a ramp having a base portion adapted to rest upon the ground and an inclined portion pivotally attached thereto, adapted to be supported in an inclined position while the wheel is being driven thereon and be collapsed to a position substantially parallel with said base portion when desired.

I have also aimed to provide a ramp having an inclined portion provided with shape characteristics adapted to notify the operator when a wheel is suitably positioned thereon.

A still further object of the invention is the provision of a collapsible ramp having means for collapsing the ramp while under pressure and without danger of injury to the operator.

Another object of the invention is the provision of a collapsible wheel ramp which may be manufactured at relatively small cost.

Other objects and advantages of my improved construction will become apparent to those skilled in the art from the following description and the accompanying drawings in which—

Figure 1:
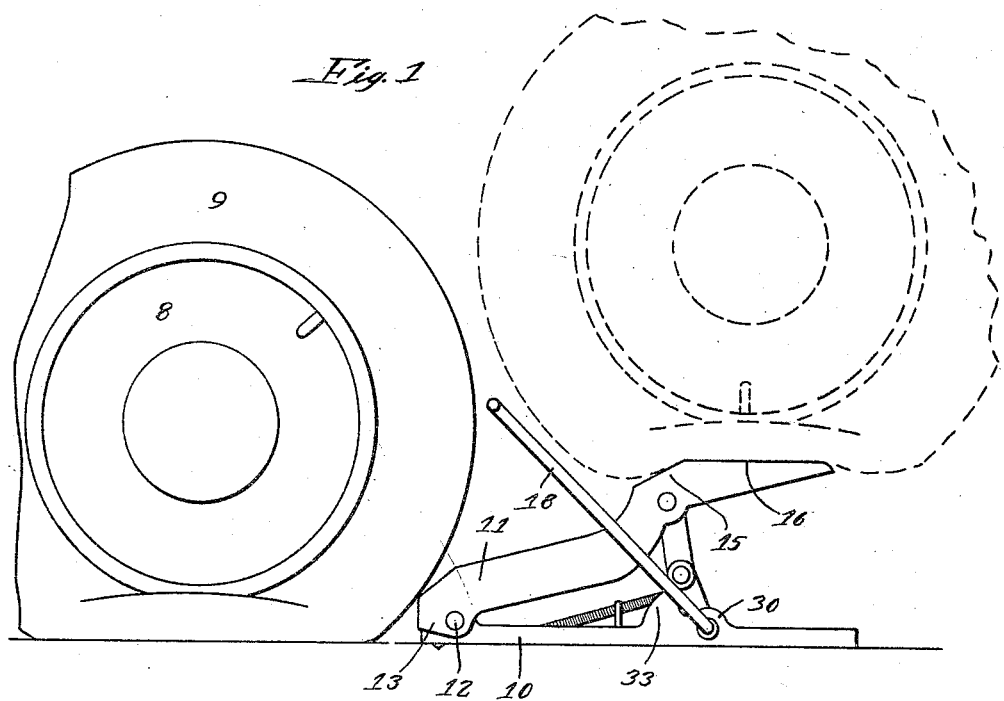
Figure 1 is a vertical elevation showing the wheel ramp and the manner in which a wheel is positioned thereon.
Figure 2:
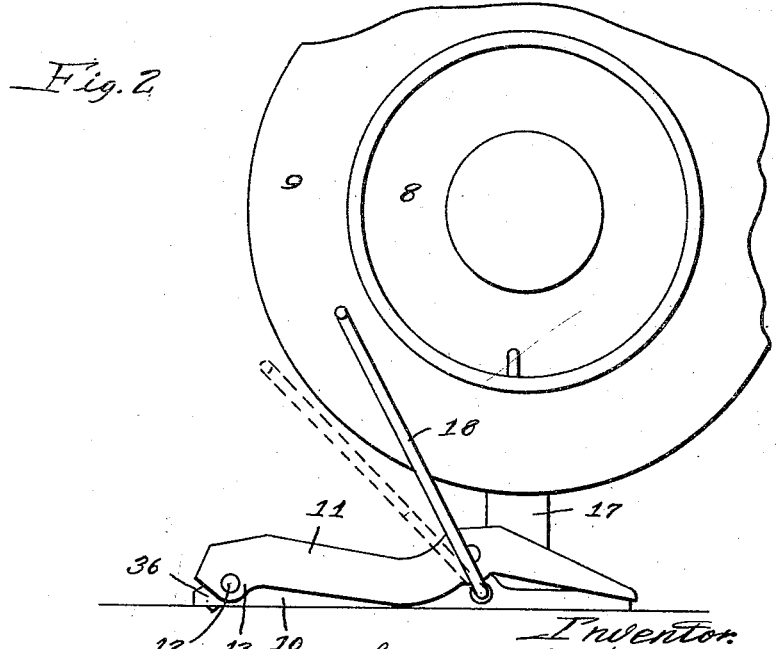
Fig. 2 is a vertical elevation showing the manner in which the ramp is collapsed to leave the wheel suspended and free to rotate.

Referring now to Figure 1, the numeral 8 designates a conventional wheel of an automobile, in this particular instance a disc wheel being shown, having a conventional pneumatic tire 9. The wheel ramp, having a base portion 10 and an inclined portion 11, is adapted to be positioned directly in front of the tire 9, as shown in this figure. The inclined portion 11 is pivotally secured to the base portion 10 by means of a bolt 12 which in this instance passes through each of two ears 13 and 14 one positioned on each side of the portion 11. The inclined portion 11 is of such width as to support the tire 9 throughout its entire width, the ears 13 and 14 projecting downward on each side of its flat upper surface. The wheel 8 is moved upon the ramp under the power of the automobile, the operator sitting in the seat of the car and driving it forward until the desired wheel has moved to the dotted line position shown in Fig. 1. An abruptly rising hump 15 on the surface of the inclined portion serves two purposes in that it notifies the operator in the driver's seat that the wheel has passed upward to the desired point on the inclined portion and also serves to form the flat upper section 16 of the inclined portion. When the wheel has been moved to the dotted line position, shown in Fig. 1, supporting means such as a jack 17, or suitable blocks, may be positioned between the axle of the vehicle and the ground, and the inclined portion 11 of the ramp lowered by moving a crank 18 to the right, as shown in Fig. 2. A small movement of the crank 18 permits the inclined portion 11 to drop downward upon the base 10 and lie substantially parallel therewith, completely free of the tire, as shown in Fig. 2, the wheel and axle being supported upon the jack 17.

Figure 3:
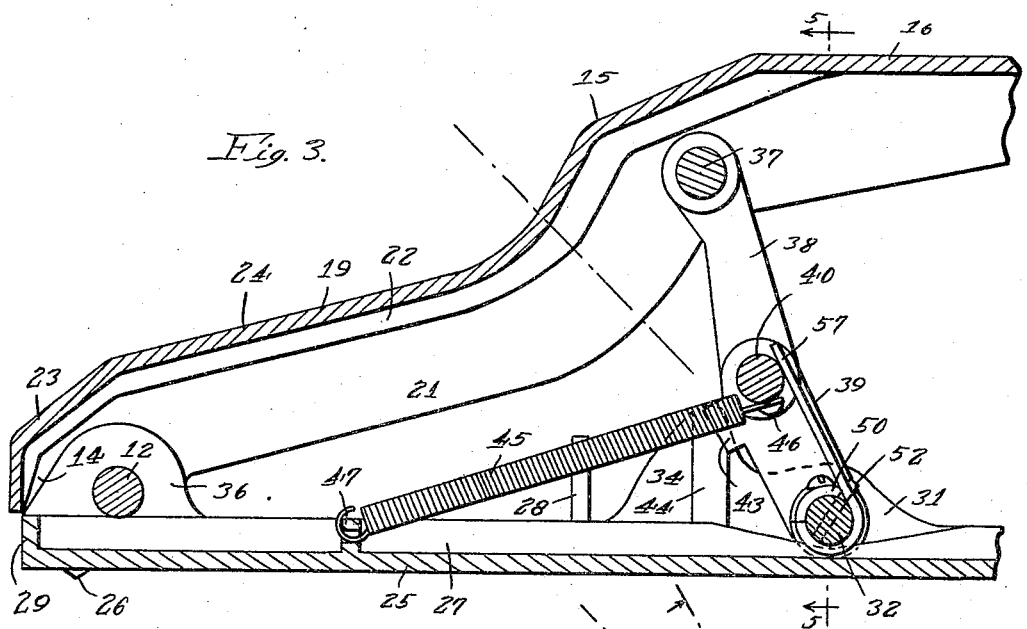
Fig. 3 is a longitudinal section through the ramp showing the manner in which the inclined portion is supported upon the base.
Figure 4:
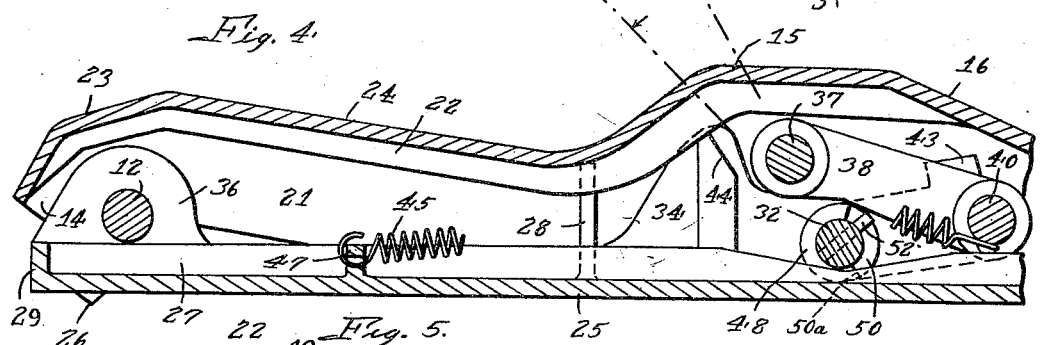
Fig. 4 is a longitudinal section showing the manner in which the ramp collapses and Fig. 5 is a section on the line 5—5 of Fig. 3.
Figure 5:
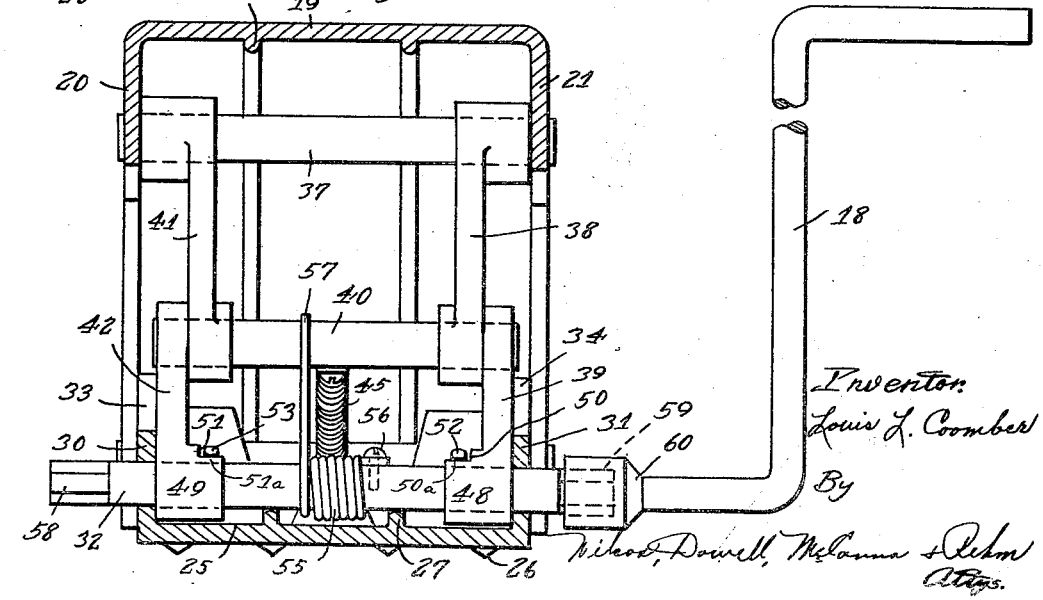

Referring to Figs. 3, 4 and 5, the inclined portion 11 comprises a wide upper surface 19 having downwardly projecting side edges 20 and 21. Suitable reenforcing ribs 22 may be positioned lengthwise of the portion 11 on the under surface thereof. The surface 19 has an abruptly rising section 23 at its lower or pivotal end, a sloping section 24 above the section 23, an abruptly rising section 15 joining the sloping section 24, and a flat section 16 joining the section 15 and extending to the upper end of the surface 19. The section 23 causes the wheel to move onto the ramp in an abrupt fashion, which appears to be necessary to the operation of the ramp. I have found, for example, that if the end of the ramp is tapered off to provide a gradual incline, the ramp will slide forward on the ground under the forward movement of the wheel and that the latter will not roll up the incline portion 11. However, when the section 23 is provided the wheel moves up onto the section 24 in an abrupt manner, forcing pins 26 into the ground. Section 24 may be extended horizontally, if desired, instead of inclined as shown, but this does not permit the ramp to collapse so compactly.

The base 10 of the ramp is provided with a substantially plain flat bottom 25 which may be provided, if desired, with downwardly extending projections or pins 26, which serve to prevent forward movement of the bottom 25 on the surface of the ground, due to the forces exerted on the ramp by movement of the tire against the end thereof. Ribs 27 lengthwise of the base portion 10 may be provided on the upper surface of the bottom 25 for the purpose of reenforcement. Further reenforcement may be provided by upstanding ribs 28 positioned crosswise of the bottom 25. The outer edge of the bottom 25 is provided with upstanding edges 29 having upstanding ears 30 and 31 on each side of the base to receive a shaft 32 and upstanding ears 33 and 34 whose function will presently be described more in detail.

Upstanding ears 35 and 36 on each side of the base 10 near one end thereof serve to receive the bolt 12 to provide a pivotal connection between the ends of the base portion 10 and the inclined portion 11. The bolt 12 passes through the ears 13 and 14 of the inclined portion 11 at a point spaced a short distance from the end of the portion 11, whereby the portion 11 may be caused to lie substantially parallel with the base portion 10 when in its lowered position, as shown in Fig. 2.

A shaft 37 is pivotally mounted in the downwardly projecting edges 20 and 21 of the inclined portion 11 substantially beneath the section 15, and slightly nearer the pivotal bolt 12 than is the shaft 32. Toggle links 38 and 39 are pivotally supported on an intermediate shaft 40, the link 38 being supported at its upper end on the shaft 37 near the downwardly projecting edge 21 of the inclined portion 11 and the link 39 being pivotally supported at its lower end on the shaft 32 near the upstanding ear 31 of the base 10. A second pair of toggle links 41 and 42 are supported in the same manner on the shaft 40 and extend between the shaft 37 and the shaft 32, the link 41 lying near the inner surface of the downwardly projecting edge 20, as shown in Fig. 5. The links 39 and 42 are each provided with stops 43 adapted to rest against abutments 44 positioned on the inner side of each of the upstanding ears 33 and 34. The stops 43 and abutments 44 are so arranged that the shaft 40 may move toward the left facing Fig. 3 only slightly beyond the center line connecting the centers of shafts 32 and 37. It will be seen that in this position pressure downward on the inclined member 11 will urge the shaft 40 to the left facing Fig. 3 and the stops 43 against the abutments 44, the latter serving to prevent folding of the toggle links toward the left, thus supporting the inclined portion 11 in its upper position. A coil spring 45 is connected at one end to the shaft 40 by means of a screw 46 and is connected at the opposite end to an upstanding eye member 47 formed integral with the bottom 25. The spring tends to hold the stops 43 against abutments 44 and prevent accidental displacement of the toggle links.

The lower ends of the toggle links 39 and 42 are pivotally supported upon the shaft 32 through sleeves 48 and 49 having a portion on the inner edges thereof slotted away as shown at 50 and 51 to provide shoulders 50a and 51a. Pins 52 and 53 are positioned in the shaft 32 with their ends projecting into the slots 50 and 51 respectively, the slots permitting the shaft 32 to be rotated through a portion of a turn without bringing the pins in contact with the shoulders 50a and 51a. It will be seen, however, that when the pins 52 and 53 are brought into contact with the shoulders 50a and 51a further rotation of the shaft 32 to the right facing Fig. 3 will cause the toggle links 39 and 42 to be moved with the shaft 32 bringing the shaft 40 through the center line of the shafts 32 and 37 against the tension of the spring 45. When this movement has occurred any force exerted downward on the inclined portion 11 will automatically cause further movement of the shaft 40 bringing the toggle links into the position shown in Fig. 4, thereby lowering the inclined portion 11 upon the base 10. This movement, however, caused by downward pressure on the inclined portion 11, may take place without corresponding movement of the shaft 32, the sleeves 48 and 49 moving about the shaft 32 and the slots 50 and 51 moving free of the pins 52 and 53 to the position shown in Fig. 4. A spring 55 coiled about the shaft 32 and attached thereto by means of a screw 56 has a free end 57 extending upward and bearing against the shaft 40 in a direction to cause the shaft 32 to be rotated to maintain the pins 52 and 53 in contact with the shoulders 50a and 51a as shown in Fig. 3. It will be observed that in this manner the pins are at all times maintained in a position to permit the sleeves 48 and 49 to rotate clockwise viewing Fig. 3 on the shaft 32. This spring further augments the action of the spring 45 and serves to maintain the toggle links in their upright position. It also aids in moving the toggle links from the folded position shown in Fig. 4 to the upright position shown in Fig. 3 when the inclined portion 11 is lifted by the operator. The shaft 32 is provided with hexagonal ends 58 and 59 which cooperate with the socket 60 of the crank 18.

Operation of my improved collapsible wheel ramp will be seen to be at once simple, effective, and convenient. The device is adapted to be carried in the usual tool kit of a motor vehicle where it may be readily reached in case of tire troubles. When a puncture appears the operator removes the ramp from the kit, places it upon the ground in front of the wheel having the deflated tire and raises the inclined portion 11 to the position shown in Fig. 1. He then takes his place upon the driver's seat and drives the vehicle forward. The movement of the wheel as it moves from the ground over the sharply inclined portion 23 onto the sloping section 24 will be perceptible to the driver as will the movement when the wheel moves over the sharply inclined section 15 onto the flat section 16. When the wheel reaches the flat section 16 the driver stops the car and places the jack in its extended position beneath the axle of the car, near the wheel. The crank 18 is then moved through a slight degree of angularity as shown by the broken lines in Fig. 4 and in Fig. 2, when the weight of the wheel on the flat section 16 will cause the continued folding movement of the toggle links lowering the section 16 away from the tire and leaving the wheel suspended upon the jack.

It will be seen that the construction is such that the crank 18 need not move through the same degree of angularity as the sleeves 48 and 49. If such were the case the hands of the operator might be severely injured by the violent movement of the crank 18 when the inclined portion is lowered. Such movement would cause the hands of the operator to be caught between the crank 18 and the ground should the jack 17 fail to hold the wheel supported. On the other hand by this construction the operator merely moves the crank between the two dotted line positions of Fig. 4 from which point the inclined portion 11 collapses down upon the base 10 without further movement of the crank 18. This is clearly shown in Fig. 2 of the drawings.

Convenient means are provided for clearly indicating to the operator when the wheel has reached the proper position on the inclined portion 11. The section 23 notifies the operator that the wheel has begun to move up along the portion 11 and the section 15 notifies the operator that the wheel has reached the flat section 16, at which point the wheel must be stopped.

The ramp in its folded position occupies but a very small amount of space and may be stored with convenience along with the customary tools of an automobile.

The construction of the device is exceedingly simple and inexpensive permitting it to be manufactured at a small relative cost.

While I have thus described and illustrated a specific embodiment of my invention I am aware that numerous alterations may be made therein and I do not wish to be limited except as required by the prior art and the scope of the appended claims.

I claim:

1. A portable wheel ramp upon which the wheel of an automobile is adapted to be driven, whereby supporting means may be placed beneath the axle thereof, comprising in combination, a base adapted to rest upon the ground, an inclined portion pivotally attached at one end to said base along which said wheel is adapted to move to be elevated, at least one toggle link pivotally attached at one end to said inclined portion, a second toggle link pivotally attached at its upper end to the lower end of said first toggle link and having a slotted sleeve positioned at the lower end thereof, a shaft journaled in said base and positioned within said sleeve, an abutment on said base adapted to support said toggle links on one side of the center line thereof, means on said shaft adapted to engage the end of said slot whereby rotation of said shaft in one direction will cause rotation of said second toggle link, moving the pivotal connection between said toggle links through the center line thereof, said slot permitting movement of said toggle links independent of said shaft, under the weight of said inclined portion, whereby said inclined portion is lowered, to leave said wheel suspended.

2. A portable wheel ramp upon which the wheel of an automobile is adapted to be driven whereby supporting means may be placed beneath the axle thereof, comprising in combination, a base adapted to rest upon the ground, an inclined portion pivotally attached at one end to said base along which said wheel is adapted to move to be elevated, at least one toggle link pivotally attached at one end to said inclined portion, a second toggle link pivotally attached at its upper end to the lower end of said first toggle link and having a slotted sleeve positioned at the lower end thereof, a shaft journaled in said base and positioned within said sleeve, an abutment on said base adapted to support said toggle links on one side of the center line thereof, a spring arranged to maintain said toggle links against said abutment, means on said shaft adapted to engage the end of said slot whereby rotation of said shaft in one direction will cause rotation of said second toggle link, moving the pivotal connection between said toggle links through the center line thereof, said slot permitting movement of said toggle links independent of said shaft, under the weight of said inclined portion, whereby said inclined portion is lowered to leave said wheel suspended.

3. A portable wheel ramp upon which the wheel of an automobile is adapted to be driven whereby supporting means may be placed beneath the axle thereof, comprising in combination, a base adapted to rest upon the ground, an inclined portion pivotally attached at one end to said base along which said wheel is adapted to move to be elevated, at least one toggle link pivotally attached at one end to said inclined portion, a second toggle link pivotally attached at its upper end to the lower end of said first toggle link and having a slotted sleeve positioned at the lower end thereof, a shaft journaled in said base and positioned within said sleeve, a lever releasably secured to said shaft whereby the operator may manually cause the rotation thereof, an abutment on said base adapted to support said toggle links on one side of the center line thereof, means on said shaft adapted to engage the end of said slot whereby rotation of said shaft in one direction will cause rotation of said second toggle link, moving the pivotal connection between said toggle links through the center line thereof, said slot permitting movement of said toggle links independent of said shaft, under the weight of said inclined portion, whereby said inclined portion is lowered to leave said wheel suspended.

4. A portable wheel ramp upon which the wheel of an automobile is adapted to be driven whereby supporting means may be placed beneath the axle thereof, comprising in combination, a base adapted to rest upon the ground, an inclined portion pivotally attached to said base, along which said wheel is adapted to move to be elevated, means for supporting said inclined portion in an inclined position, said inclined portion having an abruptly rising section at the lower end thereof for abruptly bringing said wheel onto said ramp and indicating to the operator when said wheel moves onto said inclined portion, said inclined portion having a flat section upon which said wheel is to be brought to rest and having an abruptly rising section for indicating to the operator when said wheel reaches said flat section, and means for lowering said inclined portion when supporting means have been placed beneath said axle to leave said wheel suspended therefrom.

In witness of the foregoing I affix my signature.

LOUIS L. COOMBER.